(12) United States Patent
Versteeg et al.

(10) Patent No.: US 12,480,925 B2
(45) Date of Patent: Nov. 25, 2025

(54) METHODS, SYSTEMS, AND DEVICES FOR TOMOGRAPHIC RHIZOSPHERE IMAGER

(71) Applicant: The Regents of The University of California, Oakland, CA (US)

(72) Inventors: Roelof Versteeg, Hanover, NH (US); Yuxin Wu, El Cerrito, CA (US)

(73) Assignee: The Regents of the University of California, Oakland, CA (US)

( * ) Notice: Subject to any disclaimer, the term of this patent is extended or adjusted under 35 U.S.C. 154(b) by 492 days.

(21) Appl. No.: 18/018,204

(22) PCT Filed: Jul. 28, 2021

(86) PCT No.: PCT/US2021/043559
§ 371 (c)(1),
(2) Date: Jan. 26, 2023

(87) PCT Pub. No.: WO2022/026614
PCT Pub. Date: Feb. 3, 2022

(65) Prior Publication Data
US 2023/0273167 A1    Aug. 31, 2023

Related U.S. Application Data
(60) Provisional application No. 63/059,944, filed on Jul. 31, 2020.

(51) Int. Cl.
*G01N 33/00* (2006.01)
*A01G 7/00* (2006.01)
(Continued)

(52) U.S. Cl.
CPC ........... *G01N 33/0098* (2013.01); *A01G 7/00* (2013.01); *G01N 27/02* (2013.01); *G01N 27/327* (2013.01); *G06F 3/00* (2013.01); *H04L 65/40* (2013.01)

(58) Field of Classification Search
CPC .. G01N 33/0098; G01N 27/02; G01N 27/327; A01G 7/00; G06F 3/00; H04L 65/40; C12Q 1/02
See application file for complete search history.

(56) References Cited

U.S. PATENT DOCUMENTS

| | | |
|---|---|---|
| 2009/0322357 A1 | 12/2009 | Beaulieu |
| 2016/0333387 A1 | 11/2016 | Turick et al. |
| 2018/0348186 A1* | 12/2018 | Benfey .................. G01R 27/22 |

FOREIGN PATENT DOCUMENTS

| | | |
|---|---|---|
| WO | 2007128122 A1 | 11/2007 |

OTHER PUBLICATIONS

The International Search Report and Written Opinion of the International Searching Authority for International Application No. PCT/US2021/43559 mailed on Nov. 26, 2021.

(Continued)

*Primary Examiner* — Christopher Wait
(74) *Attorney, Agent, or Firm* — Womble Bond Dickinson (US) LLP (57) ABSTRACT

Disclosed herein are methods, systems, and devices for rhizosphere imaging. Methods include applying a signal to a portion of a plant and its roots via at least one first electrode, receiving the signal via at least one second electrode placed a designated distance from the plant, and generating, using one or more processors, a rhizosphere model based, at least in part, on the received signal, the generating of the rhizosphere model being implemented based, at least in part, on one or more frequency characteristics of the received signal.

20 Claims, 6 Drawing Sheets

(51) Int. Cl.
  *G01N 27/02* (2006.01)
  *G01N 27/327* (2006.01)
  *G06F 3/00* (2006.01)
  *H04L 65/40* (2022.01)

(56) References Cited

OTHER PUBLICATIONS

"Extended European Search Report" regarding Application No. 21849705.5, mailed on Jul. 15, 2024. pp. 1-12.
Corona-Lopez Diego D. et al: "Electrical impedance tomography as a tool for phenotyping plant roots", Plant Methods, vol. 15, No. 1, Dec. 1, 2019 (Dec. 1, 2019), XP093180498, GB ISSN: 1746-4811, DOI: 10.1186/s13007-019-0438-4.
Ehosioke Solomon et al: "Sensing the electrical properties of roots: A review", Vadose Zone Journal, vol. 19, No. 1, Jan. 1, 2020 (Jan. 1, 2020), XP055829554, ISSN: 1539-1663, DOI: 10.1002/vzj2.20082.
Anonymous: "Imaging and Modeling Toolbox for Roots", Dec. 4, 2016 (Dec. 4, 2016), pp. 1-2, XP093180683.
Chao Julie et al: "Berkeley Lab awarded $4.6M for transformational agriculture technologies : University of California", University of California News, Jan. 3, 2017 (Jan. 3, 2017), pp. 1-9, XP093180667.

* cited by examiner

METHODS, SYSTEMS, AND DEVICES FOR TOMOGRAPHIC RHIZOSPHERE IMAGER

CROSS-REFERENCE TO RELATED APPLICATIONS

This application claims the benefit under 35 U.S.C. § 119(e) of U.S. Provisional Patent Application No. 63/059,944, filed on Jul. 31, 2020, which is incorporated herein by reference in its entirety for all purposes.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to rhizosphere imaging, and more particularly to electrical rhizosphere imaging.

BACKGROUND

Plants have associated root systems that extend beneath a surface of soil. The area surrounding these root systems is often referred to as a rhizosphere. Accordingly, the roots of a plant may extend downwards and outwards as the plant develops and grows, and in some situations, develops a harvestable crop. The development of such roots may be indicative of the plant's development as well as the development of such harvestable crops. Conventional techniques for measuring such rhizospheres remain limited because they are not able to obtain such measurements without disturbing the soil and plant, and digging up the plant.

SUMMARY

Disclosed herein are methods, systems, and devices for rhizosphere imaging. Methods include applying a signal to a portion of a plant and its roots via at least one first electrode, receiving the signal via at least one second electrode placed a designated distance from the plant, and generating, using one or more processors, a rhizosphere model based, at least in part, on the received signal, the generating of the rhizosphere model being implemented based, at least in part, on one or more frequency characteristics of the received signal.

In some embodiments, the rhizosphere model includes a rhizosphere metric representing a physical parameter of the roots of the plant. In various embodiments, the physical parameter is an estimated length of the roots of the plant. According to some embodiments, the at least one first electrode is included in a plurality of first electrodes, and the at least one second electrode is included in a plurality of second electrodes. In some embodiments, the rhizosphere model includes a rhizosphere tomography. In various embodiments, methods further include generating a rhizosphere display object based, at least in part, on the rhizosphere tomography, the rhizosphere display object being capable of being displayed in a display device. According to some embodiments, methods further include generating a data object based on the rhizosphere model, the data object capable of being transmitted via a communications network. In some embodiments, methods additionally include transmitting the data object via a communications interface. In various embodiments, the communications interface is compatible with a WiFi communications protocol.

Also disclosed herein are systems that include at least one first electrode coupled to a portion of a plant and its roots, and at least one second electrode placed a designated distance from the plant. Systems also include a rhizosphere modeler including one or more processors configured to generate a signal applied to the at least one first electrode, obtain a plurality of measurements based on a signal received via the at least one second electrode, and generate a rhizosphere model based, at least in part, on the received signal, the generating of the rhizosphere model being implemented based, at least in part, on one or more frequency characteristics of the received signal.

In some embodiments, the rhizosphere model includes a rhizosphere metric representing a physical parameter of the roots of the plant, and the physical parameter is an estimated length of the roots of the plant. In various embodiments, the at least one first electrode is included in a plurality of first electrodes, and the at least one second electrode is included in a plurality of second electrodes. According to some embodiments, the rhizosphere model includes a rhizosphere tomography. In some embodiments, the one or more processors are further configured to generate a rhizosphere display object based, at least in part, on the rhizosphere tomography, the rhizosphere display object being capable of being displayed in a display device. In various embodiments, the rhizosphere modeler is included in a portable housing.

Further disclosed herein are devices that include a signal generator configured to generate a signal applied to at least one first electrode coupled to a plant and its roots. The devices further include one or more processors configured to obtain a plurality of measurements based on a signal received via at least one second electrode, and generate a rhizosphere model based, at least in part, on the received signal, the generating of the rhizosphere model being implemented based, at least in part, on one or more frequency characteristics of the received signal.

In some embodiments, the rhizosphere model includes a rhizosphere metric representing a physical parameter of the roots of the plant, and the physical parameter is an estimated length of the roots of the plant. In various embodiments, the at least one first electrode is included in a plurality of first electrodes, and the at least one second electrode is included in a plurality of second electrodes. According to some embodiments, the rhizosphere model includes a rhizosphere tomography. In some embodiments, the one or more processors are further configured to generate a rhizosphere display object based, at least in part, on the rhizosphere tomography, the rhizosphere display object being capable of being displayed in a display device.

Details of one or more embodiments of the subject matter described in this specification are set forth in the accompanying drawings and the description below. Other features, aspects, and advantages will become apparent from the description, the drawings, and the claims.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Some techniques for rhizosphere analysis require the digging up and exposure of a plant's root system from visual inspection and analysis. Accordingly, such techniques require disturbing of the plant as well as significant amounts of manual labor to analyze a plant's rhizosphere. Such requirements make such techniques impractical in many situations, and also prevent them from reliably being used to obtain metrics associated with a plant's development and crop yield.

Various embodiments disclosed herein provide rhizosphere imaging without the digging up and exposure of a plant's root system. As will be discussed in greater detail below, embodiments disclose herein utilize the application and measurement of electrical signals to obtain measurements that are used to infer metrics and spatial characteristics of the plant's rhizosphere. In this way, electrodes may be inserted at a surface level of the ground, and a rhizosphere analysis may be implemented. Moreover, as will also be discussed in greater detail below, techniques disclosed herein may be implemented using a hand-held portable device thus enabling a user to easily implement such rhizosphere imaging from one plant to another in rapid succession.

Accordingly, embodiments disclosed herein enable a user to implement rhizosphere imaging for multiple plants in a field, as may be the case for a crop that is to be harvested. In such situations, the user may obtain various metric using a rhizosphere modeler as disclosed herein, and such metrics may be used to approximate sub-surface development of the plants to be harvested. Accordingly, the metrics may be used to infer a quality of development/health of the crops, as well as provide an estimate of a yield of the crops.

Figure 1:
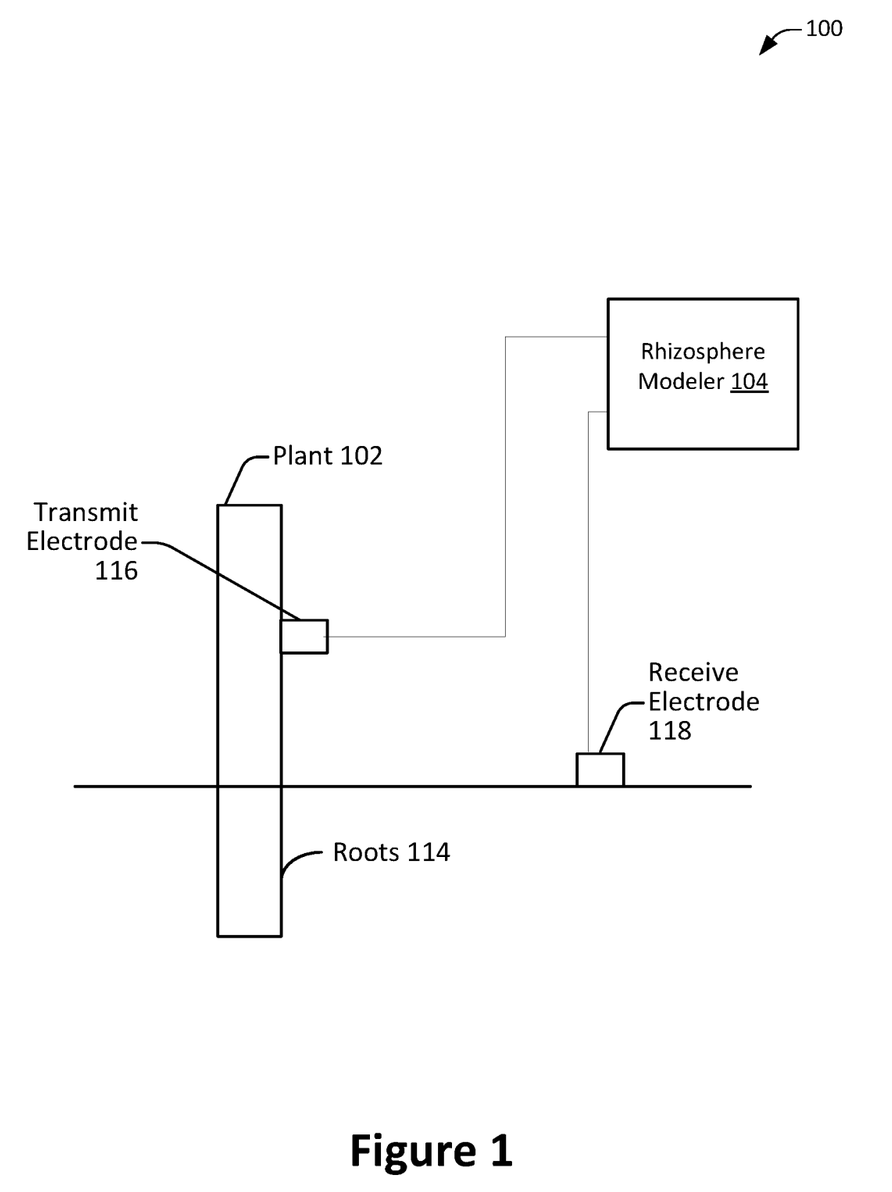
FIG. 1 illustrates a diagram of an example of a system for rhizosphere imaging, configured in accordance with some embodiments.

FIG. 1 illustrates a diagram of an example of a system for rhizosphere imaging, configured in accordance with some embodiments. As will be discussed in greater detail below, systems disclosed herein, such as system 100, may be configured to send and receive signals, and generate models and graphical representations of rhizospheres associated with plants. Accordingly, embodiments disclosed herein may be configured to utilize a variety of configurations of electrodes and corresponding measurements to approximate a shape and size of a root system of a plant.

Accordingly, system 100 may be implemented as shown in FIG. 1, and coupled to a plant, such as plant 102. In various embodiments, plant 102 may be a crop plant that is grown for agricultural purposes. Plant 102 may be planted in the ground, and roots 114 may extend beneath the surface of the ground in an area referred to herein as the rhizosphere. Accordingly, the rhizosphere as described herein may refer to an area of the soil that is adjacent to and influenced by roots, such as roots 114, of a plant, such as plant 102. While FIG. 1 illustrates one example of plant 102, it will be appreciated that system 100 may be implemented with various different types of plants as well.

System further includes rhizosphere modeler 104 which may be coupled to one or more electrodes, such as transmit electrode 116 and receive electrode 118. As will be discussed in greater detail below, rhizosphere modeler 104 is configured to generate a signal that is passed through plant 102 and roots 114, and then obtain measurements after the signal has passed through plant 102 and roots 114. Rhizosphere modeler 104 is further configured to identify and utilize changes in the signal to infer features and aspects, such as physical and morphological aspects, of roots 114 associated with plant 102. Furthermore, rhizosphere modeler 104 is configured to generate a rhizosphere model that characterizes or represents roots 114. For example, rhizosphere modeler 104 may generate a metric that represents an overall mass or development of roots 114. As will be discussed in greater detail below with reference to FIG. 2, rhizosphere modeler 104 may also generate a representation of roots 114 that describes a physical distribution of roots 114. In this way, rhizosphere modeler 104 may be configured to generate a visual representation of roots 114. Moreover, the various metrics and representations generated by rhizosphere modeler 104 may be packaged as data objects capable of network transmission. Accordingly, an output of rhizosphere modeler 104 may be transmitted to one or more other processing devices or computer systems. Additional details regarding rhizosphere modeler 104 are discussed in greater detail below with reference to FIG. 3.

As shown in FIG. 1, transmit electrode 116 may be placed on plant 102, and receive electrode 118 may be place in a surface of the ground. Accordingly, the placement of transmit electrode 116 and receive electrode 118 may be specifically determined to enable the rhizosphere modeling described above and in greater detail below. As discussed above, a signal may be generated by rhizosphere modeler 104, may be passed through transmit electrode 116, may pass through plant 102, roots 114, and the ground until it is received at received electrode 118. In this way, rhizosphere modeler 104 may utilize various electrodes, such as transmit electrode 116 and receive electrode 118, to obtain measurements that may be used to generate rhizosphere models, metrics, and tomographies.

Figure 2:
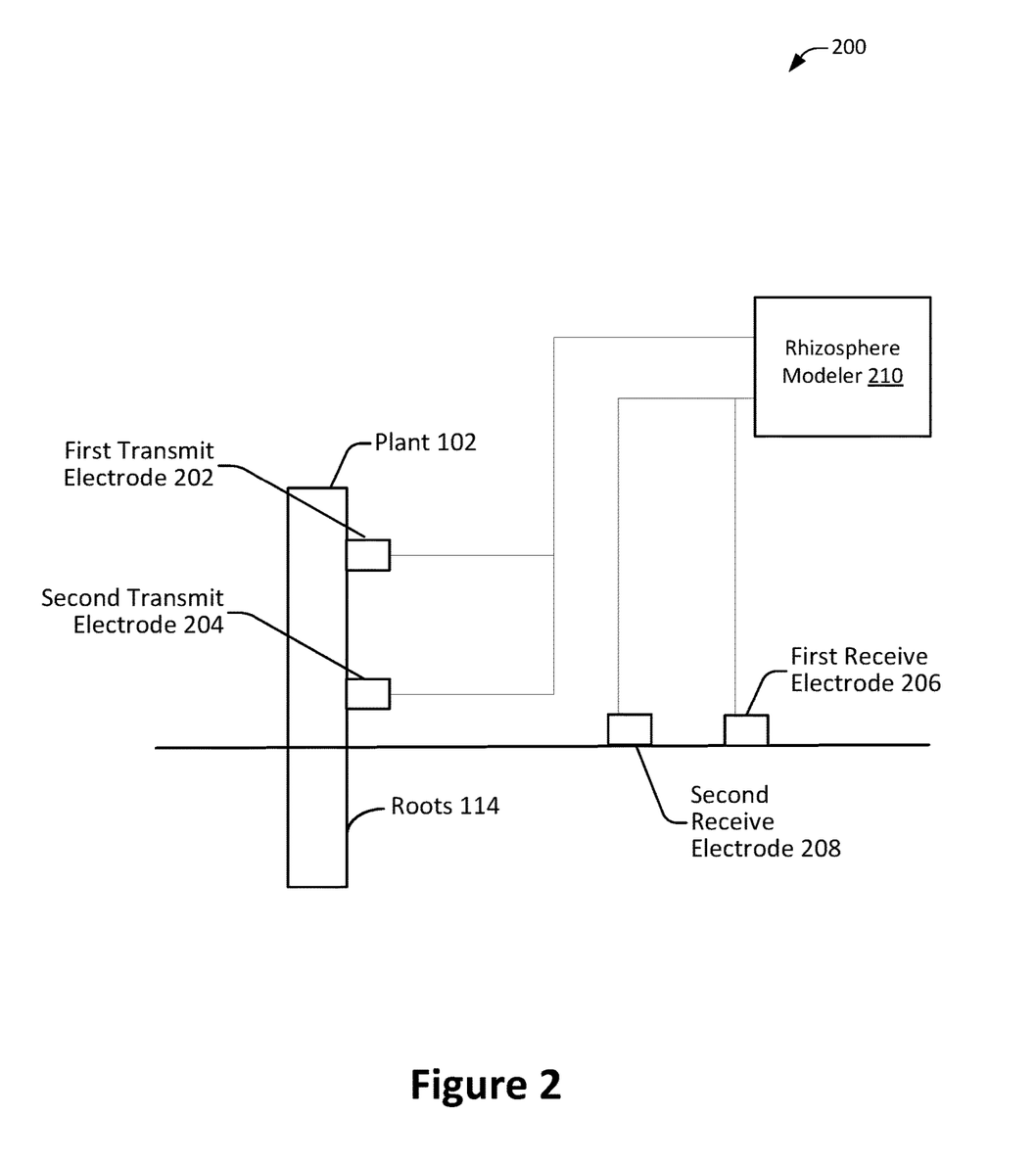
FIG. 2 illustrates a diagram of another example of a system for rhizosphere imaging, configured in accordance with some embodiments.

FIG. 2 illustrates a diagram of another example of a system for rhizosphere imaging, configured in accordance with some embodiments. As similarly discussed above, systems disclosed herein may be configured to send and receive signals, and generate models and graphical representations of rhizospheres associated with plants. In various embodiments, a system, such as system 200, may be configured to include multiple electrodes to obtain measurements and generate additional approximations of a root system of a plant.

Accordingly, as similarly discussed above with reference to FIG. 1, system 200 may include rhizosphere modeler 201 which is coupled to plant 102, which has roots 114 under a surface of the ground. As noted above, rhizosphere modeler 210 is configured to generate a signal that is passed through plant 102 and roots 114, and then obtain measurements after the signal has passed through plant 102 and roots 114. Moreover, rhizosphere modeler 210 is further configured to identify and utilize changes in the signal to infer features and aspects, such as physical and morphological aspects, of roots 114 associated with plant 102. In various embodiments, rhizosphere modeler 210 is a multichannel device that is configured to transmit and receive signals using multiple channels. As will be discussed in greater detail below, the utilization of multiple channels and measurements across such multiple channels enables specific identification and generation of representations of a tomography or map of roots 114.

Accordingly, as additionally shown in FIG. 2, system 200 may include multiple transmit and receive electrodes. For example, system 200 may include first transmit electrode 202 and second transmit electrode 204. Moreover, system 200 may include first receive electrode 206 and second receive electrode 208. In various embodiments, each electrode is associated with a different channel, and thus may be associated with a particular frequency band of the applied signal. In this way, multiple channels may be used to obtain multiple measurements on multiple different frequency bands. In some embodiments, for example if one transmit electrode and receive electrode are used, different frequency bands may be used sequentially as may occur in a cycle or sweep, and measurements on multiple different frequency bands may be obtained.

Figure 3:
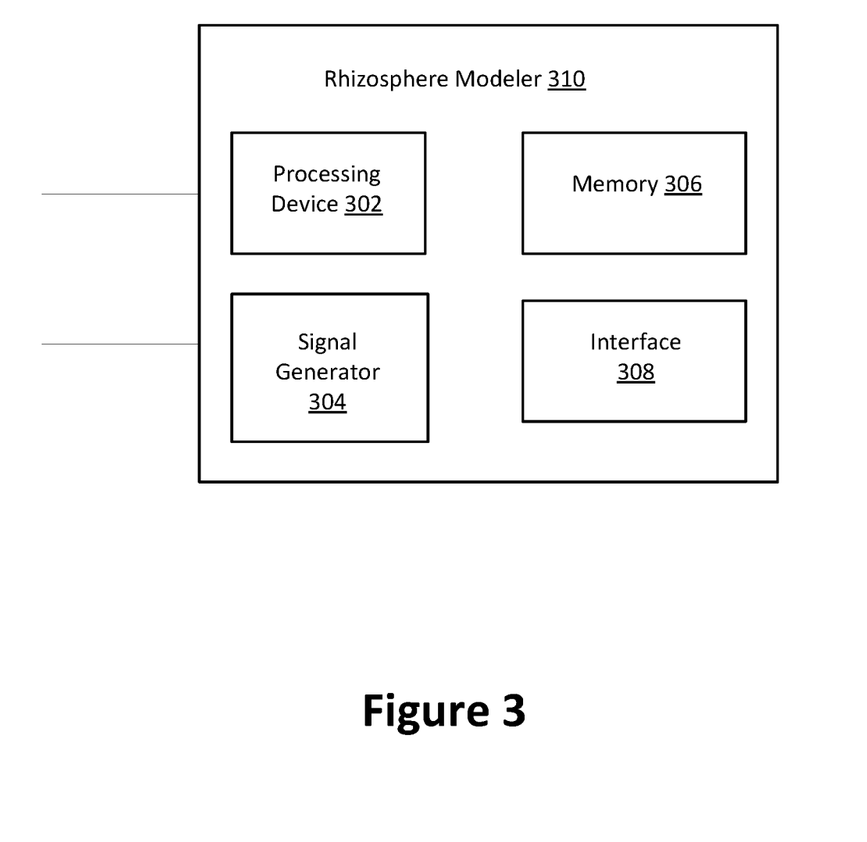
FIG. 3 illustrates a diagram of an example of a device for rhizosphere imaging, configured in accordance with some embodiments.

FIG. 3 illustrates a diagram of an example of a device for rhizosphere imaging, configured in accordance with some embodiments. As similarly discussed above, a rhizosphere modeler may be configured to send and receive signals, and generate models and graphical representations of rhizospheres associated with plants. In various embodiments, a rhizosphere modeler, such as rhizosphere modeler 310, may be configured to generate such models and representations, as well as transmit such models and representations via a communications network such as the internet.

Accordingly, rhizosphere modeler 310 includes signal generator 304 which is configured to generate an electrical signal having a particular amplitude and frequency of oscillation. Accordingly, the signal generated by signal generator 304 may be used to pass a current through a plant and its root system via one or more electrodes. In one example, the signal generated by signal generator 304 may range from 1 mHz to 40 kHz. Accordingly, signal generator 304 may implement a sweep from a first frequency to a second frequency, and measurements may be obtained across the applied range of frequencies.

Rhizosphere modeler 310 further includes processing device 302 which includes one or more processors configured to obtain measurements from receive electrodes, as discussed above, and generate a rhizosphere model based, at least in part, on the received measurements. As discussed above, signal generator 304 may be configured to generate and apply signals at various frequency ranges. Accordingly, processing device 302 is configured to measure the return signal at those applied frequency ranges. Accordingly, processing device 302 may be configured to obtain a plurality of measurements for each applied frequency range at a particular sampling rate. The obtained measurement data may be stored in memory 306 discussed in greater detail below.

In various embodiments, processing device 302 is further configured to utilize the obtained measurements to infer features and aspects, which may be physical parameters, of the root system of the plant. In one example, processing device 302 is configured to analyze a frequency dependency of the measurements to infer morphological features of the root system. For example, a frequency response in a particular frequency band, such as 10 kHz to 20 kHz, may be analyzed to infer or determine an amount of development of a root system. Moreover, relationships between components of measured signals may be analyzed as well, such as a relationship between frequency and phase. More specifically, a phase difference may be measured over a sweep of a frequency range.

In various embodiments, the frequency spectrum of the obtained measurements may be analyzed in view of a predetermined data table to generate a rhizosphere model specific to the plant that is being measured. For example, the predetermined data table may map amplitudes of particular regions of a frequency spectrum to estimated lengths of root systems. Such a predetermined mapping may have been previously determined by an entity, such a user or administrator, during a configuration process in which known root lengths were mapped to obtained signal measurements in a controlled environment. More specifically, known compositions of soil with known lengths of roots (as may be determined by subsequent excavation and analysis) may have been used to obtained frequency and amplitude measurements. The result of such soil and root parameters and corresponding frequency and amplitude measurements may be stored as a data table. Such a predetermined data table may be stored in memory 306, and may be used to contextualize the measurements obtained by processing device 302. In this way, frequency characteristics of the obtained measurements may be used to infer rhizosphere metrics.

In some embodiments, a single measurement channel may be used to determine a rhizosphere metric, such as a total root length. Moreover, multiple measurement channels may be used to obtain additional information that may support the identification of additional features, such as a tomography and spatial map of the root system. While various embodiments disclosed herein describe processing device 302 as generating rhizosphere models and metrics, it will be appreciated that such computations may also be offloaded to other computer systems as may be implemented in a cloud-computing context. Accordingly, the measurement data may be transmitted, via interface 308, to another computer system, and that computer system may generate the rhizosphere models and metrics.

In various embodiments, configuration parameters may be used to specify various parameters used by processing device 302 and signal generator 304, such as stimulation parameters and measurement parameters. For example, parameters bounding a frequency range, a particular type of plant, and/or soil conditions may be specified. In various embodiments, such configuration parameters may be received via an interface, such as interface 308. Accordingly, a user interface may be presented to a user, the user may specify various input parameters, such as configuration parameters described above, and such parameters may be provided to processing device 302. In some embodiments, the user interface may be presented to the user on a separate computing device that is communicatively coupled to rhizosphere modeler 310. The user interface may provide the user with various drop-down menus and data fields which may be used to enter the configuration parameters.

Rhizosphere modeler 310 also includes memory 306 which is configured to store data associated with processing device 302 and signal generator 304. Accordingly, representations and data objects generated by processing device 302 may be stored in memory 306. Moreover, data underlying the determinations made by processing device 302 may also be stored in memory 306. In various embodiments, memory 306 may be a removable memory device. Accordingly, memory 306 may be a memory card that is coupled to a memory interface. In some embodiments, memory 306 is a nonvolatile memory device, such as a flash memory device.

As discussed above, rhizosphere modeler 310 additionally includes interface 308 which may be configured to provide communication with one or more other processing devices or computer systems. For example, interface 308 may be a wired interface, that enables a wired connection such as a universal serial bus (USB) connection. In another example, interface 308 may be a wireless connection. Accordingly, interface 308 may support a wireless communications protocol, such as WiFi or Bluetooth, that is used to communicate with the other processing devices or computer systems. In yet another example, interface 308 may be compatible with a wireless communications network. In such an example, a wireless communications modality, such as 5G, may be used to communicate with the other processing devices or computer systems. It will be appreciated that interface 308 may be configured to enable any combination of such communications modalities. Accordingly, interface 308 may be configured to support both a wired and wireless communications link.

In various embodiments, components of rhizosphere modeler 310 are included in a housing. Moreover, such a housing may be a portable housing, and components of rhizosphere modeler 310 may be powered via a portable power source, such as a battery. In this way, rhizosphere modeler 310 may be implemented as a portable device that may be carried by a user. Accordingly, the user may carry rhizosphere modeler 310 from plant to plant to sequentially obtain measurements and generate representations of the root systems for multiple plants sequentially.

Figure 4:
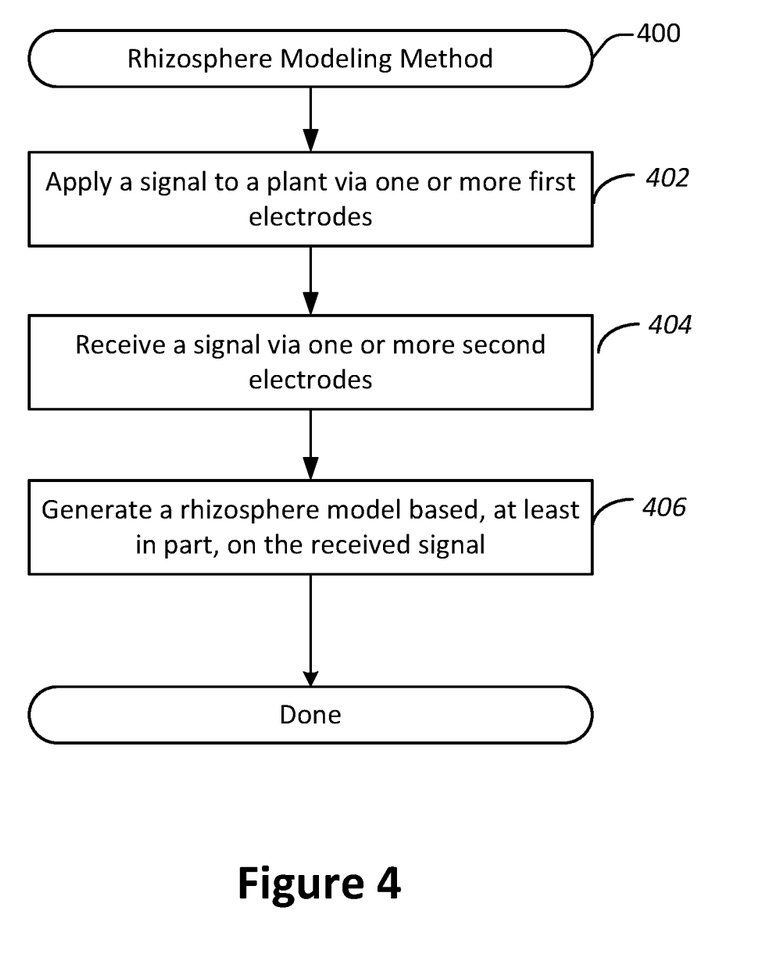
FIG. 4 illustrates a flow chart of a method for rhizosphere imaging, implemented in accordance with some embodiments.

FIG. 4 illustrates a flow chart of a method for rhizosphere imaging, implemented in accordance with some embodiments. As similarly discussed above, a rhizosphere modeler may be configured to send and receive signals, and generate models and graphical representations of rhizospheres associated with plants. In various embodiments, a method, such as method 400, may be implemented to generate such models and representations which may be stored for future use.

Accordingly, method 400 may commence with operation 402 during which a signal may be applied to a plant via one or more first electrodes. As similarly discussed above, a component of a rhizosphere modeler, such as a signal generator, may be used to generate a signal that is applied to a plant via one or more leads and electrodes. The signal may be applied as a frequency sweep, or a progression through various frequency bands.

Method 400 may proceed to operation 404 during which a signal may be received via one or more second electrodes. Accordingly, the signal may be passed through the plant, roots, and ground, and may be received at one or more second electrodes that are configured as receive electrodes. The receive electrodes may be coupled to a processing device of the rhizosphere modeler which may be configured to generate a series of measurement data based on the received signal.

Method 400 may proceed to operation 406 during which a rhizosphere model may be generated based, at least in part, on the received signal. In various embodiments, the rhizosphere model may include some form or representation of the roots of the plant. Accordingly, the rhizosphere model may include a metric and/or tomographical representation of the roots of the plant. Thus, during operation 406, the rhizosphere modeler may generate a rhizosphere model which provides an approximation of the rhizosphere of the plant. As will be discussed in greater detail below, such an approximation may be used to convey an estimate of an extent of development and mass of the root system of the plant.

Figure 5:
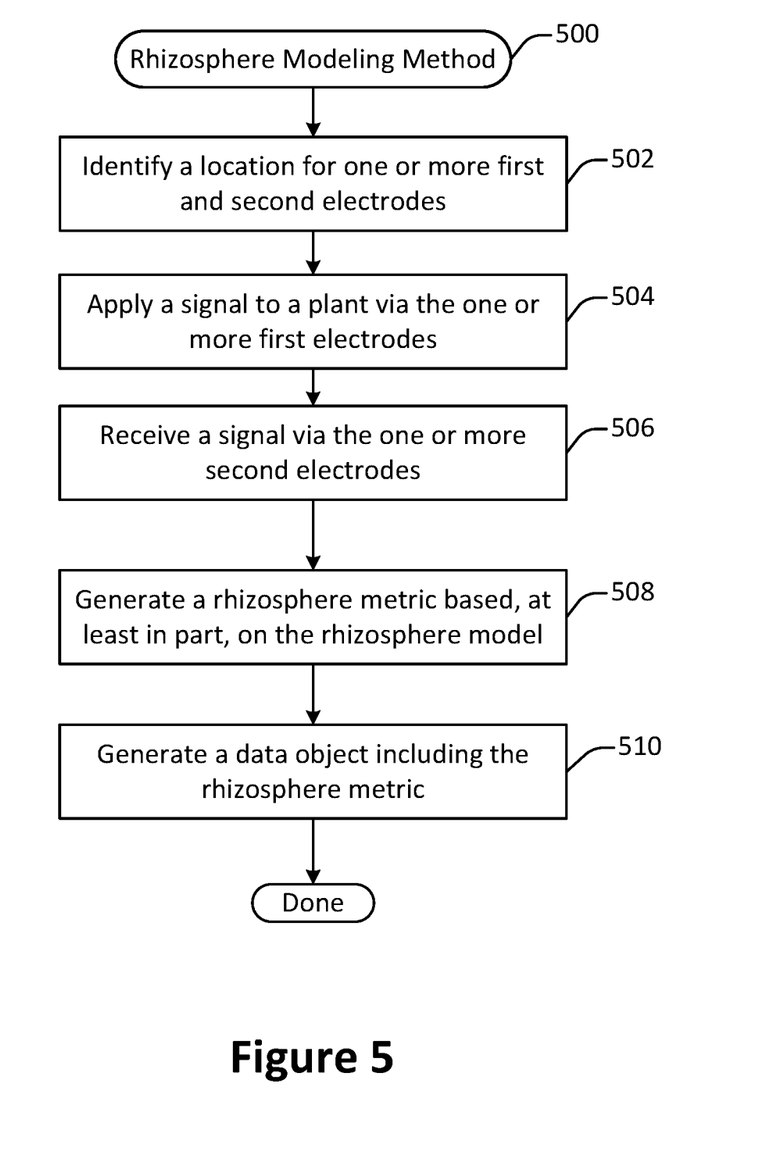
FIG. 5 illustrates a flow chart of a method for rhizosphere imaging, implemented in accordance with some embodiments.

FIG. 5 illustrates a flow chart of a method for rhizosphere imaging, implemented in accordance with some embodiments. As similarly discussed above, a rhizosphere modeler may be configured to send and receive signals, and generate models and graphical representations of rhizospheres associated with plants. In various embodiments, a method, such as method 500, may be implemented to generate rhizosphere metrics that may be used to represent specific aspects of a plant's root system, such as an estimated root length.

Accordingly, method 500 may commence with operation 502 during which a location for one or more first and second electrodes may be identified. In various embodiments, the locations for the electrodes may be determined based on a predetermined data table that was determined by an entity, such as a user or administrator, as similarly discussed above. Accordingly, an approximate location of the electrodes may be determined based on the predetermined data table and input parameters, such as a height of the plant. The locations may be identified using metrics such as a height along a stem of the plant for the first electrode, and a distance from the stem of the plant for the second electrode. Thus, the locations for the first and second electrodes may be identified, and an entity, such as a user, may place the electrodes accordingly.

Method 500 may proceed to operation 504 during which a signal may be applied to a plant via one or more first electrodes. As discussed above, a signal generator may be used to generate a signal that is applied to a plant via one or more leads that are coupled to the one or more first electrodes. Accordingly, the one or more first electrodes may be transmit electrodes that are coupled to the stem of the plant. In one example, the one or more first electrodes are needle-like electrodes that are inserted into the stem of the plant. As also discussed above, the signal may be applied as a frequency sweep, or a progression through various frequency bands.

Method 500 may proceed to operation 506 during which a signal may be received via one or more second electrodes. As similarly discussed above, the signal may be passed through the plant, roots, and ground, and may be received at one or more second electrodes that are configured as receive electrodes. The receive electrodes may be coupled to a processing device of the rhizosphere modeler which may be configured to generate a series of measurement data based on the received signal. Accordingly, the receive electrodes may be inserted into a surface of the ground at a designated distance away from the stem of the plant, and they may be coupled to the processing device via one or more leads.

Method 500 may proceed to operation 508 during which rhizosphere metric may be generated based, at least in part, on the received signal. In various embodiments, the rhizosphere metric is a representation of a specific feature of the roots of the plant. For example, the rhizosphere metric may characterize or represent an estimated length of the roots of the plant. Thus, during operation 508, the rhizosphere modeler may generate a rhizosphere metric which provides an approximation of the root length of the plant. It will be appreciated that while one metric of root length is described, any suitable metric may be generated during operation 508.

Moreover, as similarly discussed above, the rhizosphere metric may be used to generate and/or infer other metrics, such as a plant development/health metric, or a crop yield metric. For example, a rhizosphere metric identifying a root length may be used in combination with, for example, a signal intensity obtained from the measurement data, to estimate a crop yield based, at least in part, on a predetermined mapping stored in memory.

Method 500 may proceed to operation 510 during which a data object may be generated. In various embodiments, the data object includes the rhizosphere metric. In various embodiments, the data object may be stored in memory, and may also be capable of network transmission. Accordingly, the data object may be stored in a format compatible with one or more computer programs, and may also be capable of being packetized for network transmission. In this way, the data object may subsequently be transmitted to one or more other computer systems and utilized by such other computer systems.

Figure 6:
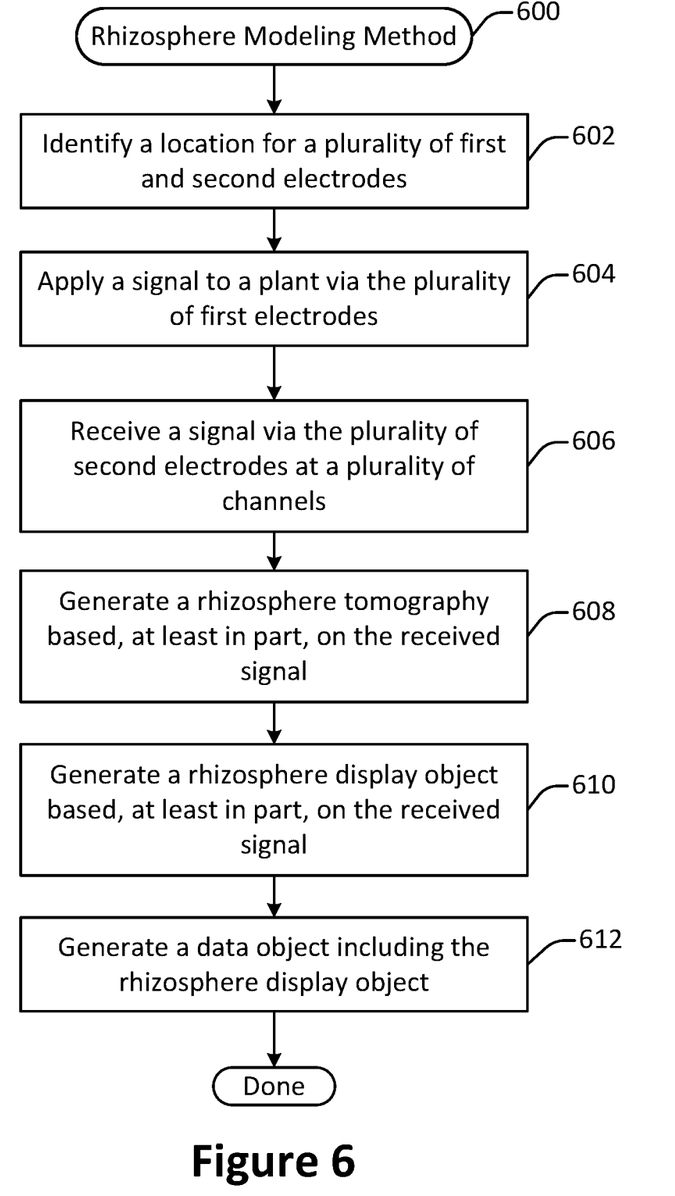
FIG. 6 illustrates a flow chart of a method for rhizosphere imaging, implemented in accordance with some embodiments.

FIG. 6 illustrates a flow chart of a method for rhizosphere imaging, implemented in accordance with some embodiments. As similarly discussed above, a rhizosphere modeler may be configured to send and receive signals, and generate models and graphical representations of rhizospheres associated with plants. In various embodiments, a method, such as method 600, may be implemented to generate a rhizosphere tomography that may be used to represent various aspects of a spatial distribution of a plant's root system. Accordingly, during method 600, a graphical representation of the root system may be generated.

Accordingly, method 600 may commence with operation 602 during which a location for a plurality of first and second electrodes may be identified. As similarly discussed above, the locations for the electrodes may be determined based on a predetermined data table and input parameters, such as a height of the plant. The locations may be specified using metrics such as a height along a stem of the plant for the first electrode, and a distance from the stem of the plant for the second electrode. Thus, the locations for the first and second electrodes may be identified, and an entity, such as a user, may place the electrodes accordingly.

Method 600 may proceed to operation 604 during which a signal may be applied to a plant via the plurality of first electrodes. As discussed above, a signal generator may be used to generate a signal that is applied to a plant via a plurality of leads that are coupled to the plurality of first electrodes. As discussed above, the plurality of first electrodes may be transmit electrodes that are coupled to the stem of the plant. In one example, the plurality of first electrodes are needle-like electrodes that are inserted into the stem of the plant. As also discussed above, the signal may be applied as a frequency sweep, or a progression through various frequency bands.

Method 600 may proceed to operation 606 during which a signal may be received via a plurality of second electrodes. As similarly discussed above, the signal may be passed through the plant, roots, and ground, and may be received at the plurality of second electrodes that are configured as receive electrodes. The receive electrodes may be coupled to a processing device of the rhizosphere modeler which generates a series of measurement data based on the received signal. Accordingly, the receive electrodes may be inserted into a surface of the ground at a designated distance away from the stem of the plant, and they may be coupled to the processing device via one or more leads.

Method 600 may proceed to operation 608 during which a rhizosphere tomography may be generated based, at least in part, on the received signal. In various embodiments, the rhizosphere tomography is configured to provide a spatial representation of the roots of the plant. For example, the rhizosphere tomography may be a matrix values corresponding to signal strength at different spatial locations, and thus providing an approximate representation of root mass across different voxels. Accordingly, during operation 608, the rhizosphere modeler may generate the rhizosphere tomography which includes a representation of the spatial distribution of the roots of the plant inferred from the measurement data.

Method 600 may proceed to operation 610 during which a rhizosphere display object may be generated based, at least in part, on the received signal. In various embodiments, the rhizosphere tomography may be used to generate a rhizosphere display object that is capable of being displayed in a display device of a processing device or computer system. Accordingly, the rhizosphere display object may provide a graphical representation of the rhizosphere tomography that is viewable by a user. In one example, the rhizosphere display object may be a heat map in which the previously described matrix values are mapped to colors in accordance with a color-coding scheme. In such an example, the rhizosphere display object may represent a cross-section of soil, and a color-coded heat map may provide an approximate representation of the spatial distribution of the roots within the cross-section. It will be appreciated that any suitable implementation of a graphical representation may be used for the rhizosphere display object.

Method 600 may proceed to operation 612 during which a data object may be generated. In various embodiments, the data object includes the rhizosphere display object. Accordingly, the rhizosphere display object may be packaged in a data object that may be stored in memory. Furthermore, as also discussed above, the data object may also be capable of network transmission. Accordingly, the data object may be stored in a format compatible with one or more computer programs, and may also be capable of being packetized for network transmission.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method comprising:
applying a signal to a portion of a plant and its roots via at least one first electrode, the roots having a physical parameter;
receiving the signal via at least one second electrode placed a designated distance from the plant; and
generating, using one or more processors, a rhizosphere model based, at least in part, on the received signal, the generating of the rhizosphere model being implemented based, at least in part, on one or more frequency characteristics of the received signal.

2. The method of claim 1, wherein the rhizosphere model comprises a rhizosphere metric representing the physical parameter of the roots of the plant.

3. The method of claim 1 or claim 2, wherein the physical parameter is an estimated length of the roots of the plant.

4. The method of claim 1, wherein the at least one first electrode is included in a plurality of first electrodes, and wherein the at least one second electrode is included in a plurality of second electrodes.

5. The method of claim 1 or claim 4, wherein the rhizosphere model comprises a rhizosphere tomography.

6. The method of claim 5 further comprising:
generating a rhizosphere display object based, at least in part, on the rhizosphere tomography, the rhizosphere display object being capable of being displayed in a display device.

7. The method of claim 1 further comprising:
generating a data object based on the rhizosphere model, the data object capable of being transmitted via a communications network.

8. The method of claim 7 further comprising:
transmitting the data object via a communications interface.

9. The method of claim 8, wherein the communications interface is compatible with a WiFi communications protocol.

10. A system comprising:
at least one first electrode coupled to a portion of a plant and its roots;
at least one second electrode placed a designated distance from the plant; and
a rhizosphere modeler comprising one or more processors configured to:
generate a signal applied to the at least one first electrode;
obtain a plurality of measurements based on a signal received via the at least one second electrode; and
generate a rhizosphere model based, at least in part, on the received signal, the generating of the rhizosphere model being implemented based, at least in part, on one or more frequency characteristics of the received signal.

11. The system of claim 10, wherein the rhizosphere model comprises a rhizosphere metric representing a physical parameter of the roots of the plant, and wherein the physical parameter is an estimated length of the roots of the plant.

12. The system of claim 10, wherein the at least one first electrode is included in a plurality of first electrodes, and wherein the at least one second electrode is included in a plurality of second electrodes.

13. The system of claim 10 or claim 12, wherein the rhizosphere model comprises a rhizosphere tomography.

14. The system of claim 13, wherein the one or more processors are further configured to:
generate a rhizosphere display object based, at least in part, on the rhizosphere tomography, the rhizosphere display object being capable of being displayed in a display device.

15. The system of claim 10, wherein the rhizosphere modeler is included in a portable housing.

16. A device comprising:
a signal generator configured to generate a signal applied to at least one first electrode coupled to a plant and its roots; and
one or more processors configured to:
obtain a plurality of measurements based on a signal received via at least one second electrode; and
generate a rhizosphere model based, at least in part, on the received signal, the generating of the rhizosphere model being implemented based, at least in part, on one or more frequency characteristics of the received signal.

17. The device of claim 16, wherein the rhizosphere model comprises a rhizosphere metric representing a physical parameter of the roots of the plant, and wherein the physical parameter is an estimated length of the roots of the plant.

18. The device of claim 16, wherein the at least one first electrode is included in a plurality of first electrodes, and wherein the at least one second electrode is included in a plurality of second electrodes.

19. The device of claim 16 or claim 18, wherein the rhizosphere model comprises a rhizosphere tomography.

20. The device of claim 19, wherein the one or more processors are further configured to:
generate a rhizosphere display object based, at least in part, on the rhizosphere tomography, the rhizosphere display object being capable of being displayed in a display device.

* * * * *